United States Patent
Dewey et al.

(10) Patent No.: US 7,529,778 B1
(45) Date of Patent: May 5, 2009

(54) SYSTEM AND METHOD FOR PROVIDING ACCESS TO CONSISTENT POINT-IN-TIME FILE VERSIONS

(75) Inventors: Brian K. Dewey, Seattle, WA (US); David Kruse, Kirkland, WA (US); Shishir Pardikar, Redmond, WA (US); Sanjay Anand, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 81 days.

(21) Appl. No.: 10/021,392

(22) Filed: Dec. 12, 2001

(51) Int. Cl.
*G06F 17/30* (2006.01)

(52) U.S. Cl. .................. 707/203; 707/202; 707/204; 707/10

(58) Field of Classification Search ............. 707/3, 707/200, 201–205, 10, 101
See application file for complete search history.

(56) References Cited

U.S. PATENT DOCUMENTS

| | | | |
|---|---|---|---|
| 4,399,504 A | 8/1983 | Obermarck et al. | |
| 4,503,499 A * | 3/1985 | Mason et al. | 718/101 |
| 4,780,821 A | 10/1988 | Crossley | |
| 4,791,566 A | 12/1988 | Sudama et al. | |
| 4,825,354 A | 4/1989 | Agrawal et al. | |
| 4,887,204 A | 12/1989 | Johnson et al. | |
| 4,891,785 A | 1/1990 | Donohou | |
| 4,914,570 A | 4/1990 | Peacock | |
| 5,008,853 A * | 4/1991 | Bly et al. | 345/751 |
| 5,043,871 A * | 8/1991 | Nishigaki et al. | 707/202 |
| 5,109,519 A | 4/1992 | Zimmet et al. | |
| 5,113,519 A | 5/1992 | Johnson | |
| 5,202,971 A | 4/1993 | Henson et al. | |
| 5,218,696 A | 6/1993 | Baird | |
| 5,261,051 A | 11/1993 | Masden et al. | |
| 5,265,261 A | 11/1993 | Rubin et al. | |
| 5,349,642 A | 9/1994 | Kington | |
| 5,375,207 A | 12/1994 | Blakely et al. | |
| 5,410,697 A | 4/1995 | Baird et al. | |

(Continued)

FOREIGN PATENT DOCUMENTS

EP 1259045 11/2002

(Continued)

OTHER PUBLICATIONS

Lilien, Leszek Tadeusz, "Integrity in Database Systems," University of Pittsburgh, (1983).

(Continued)

*Primary Examiner*—Cam Y T Truong
(74) *Attorney, Agent, or Firm*—Merchant & Gould, P.C.

(57) ABSTRACT

A system and method that automatically and transparently enable access to prior file or folder versions for a selected file or folder. When a file or folder is selected for version location, such as via a user interface, prior versions are automatically located and time data (e.g., determined from timestamps) identifying each of the prior versions is displayed. The user can then select a prior version for restoration and thereby recover from changed file data. The present invention can be implemented using remote file servers, or with local file system volumes. Prior to displaying the versions for selection, attributes of the prior versions may be requested, whereby only versions that actually exist can be displayed, and/or only versions with possibly different data are displayed, reducing unnecessary selection for restoration.

12 Claims, 6 Drawing Sheets

U.S. PATENT DOCUMENTS

| | | | |
|---|---|---|---|
| 5,437,013 | A | 7/1995 | Rubin et al. |
| 5,452,447 | A | 9/1995 | Nelson et al. |
| 5,491,752 | A | 2/1996 | Kaufman et al. |
| 5,493,728 | A | 2/1996 | Solton et al. |
| 5,513,314 | A | 4/1996 | Kandasamy et al. |
| 5,535,375 | A | 7/1996 | Eshel |
| 5,560,008 | A | 9/1996 | Johnson |
| 5,588,117 | A | 12/1996 | Karp |
| 5,628,005 | A | 5/1997 | Hurvig |
| 5,634,052 | A * | 5/1997 | Morris .......................... 707/1 |
| 5,764,887 | A | 6/1998 | Kells |
| 5,787,411 | A * | 7/1998 | Groff et al. .................... 707/2 |
| 5,832,508 | A * | 11/1998 | Sherman et al. ............. 707/200 |
| 5,873,103 | A * | 2/1999 | Trede et al. ................. 707/204 |
| 5,895,470 | A * | 4/1999 | Pirolli et al. ................ 707/102 |
| 5,931,913 | A | 8/1999 | Meriwether |
| 5,978,802 | A | 11/1999 | Hurvig |
| 6,078,932 | A | 6/2000 | Haye et al. |
| 6,088,694 | A * | 7/2000 | Burns et al. ..................... 707/8 |
| 6,092,199 | A | 7/2000 | Dutcher |
| 6,108,285 | A * | 8/2000 | Freeman et al. ............. 707/200 |
| 6,112,024 | A * | 8/2000 | Almond et al. ............. 707/203 |
| 6,208,952 | B1 | 3/2001 | Goertzel |
| 6,212,512 | B1 * | 4/2001 | Barney et al. .................. 707/1 |
| 6,212,531 | B1 | 4/2001 | Blea et al. |
| 6,219,799 | B1 | 4/2001 | Kandasamy |
| 6,263,360 | B1 * | 7/2001 | Arnold et al. ............... 709/203 |
| 6,272,547 | B1 * | 8/2001 | McWilliams ................ 709/232 |
| 6,324,581 | B1 | 11/2001 | Xu |
| 6,349,250 | B1 | 2/2002 | Hart et al. |
| 6,349,350 | B1 | 2/2002 | Hathorn et al. |
| 6,401,123 | B1 | 6/2002 | Shields |
| 6,430,691 | B1 | 8/2002 | Di Santo et al. |
| 6,438,691 | B1 | 8/2002 | Mao |
| 6,452,903 | B1 | 9/2002 | Peck et al. |
| 6,453,354 | B1 | 9/2002 | Jiang |
| 6,510,552 | B1 * | 1/2003 | Benayoun et al. ........... 717/170 |
| 6,571,245 | B2 * | 5/2003 | Huang et al. .................. 707/10 |
| 6,598,059 | B1 * | 7/2003 | Vasudevan et al. .......... 707/203 |
| 6,610,105 | B1 * | 8/2003 | Martin et al. ................ 715/513 |
| 6,611,850 | B1 * | 8/2003 | Shen ........................ 707/204 |
| 6,622,164 | B1 * | 9/2003 | Harrison et al. ............. 709/217 |
| 6,625,623 | B1 * | 9/2003 | Midgley et al. ............. 707/204 |
| 6,629,110 | B2 * | 9/2003 | Cane et al. .................. 707/204 |
| 6,658,476 | B1 | 12/2003 | Van |
| 6,766,334 | B1 * | 7/2004 | Kaler et al. ................. 707/203 |
| 6,847,984 | B1 * | 1/2005 | Midgley et al. ............. 707/204 |
| 6,910,082 | B1 | 6/2005 | Marcotte |
| 6,981,114 | B1 * | 12/2005 | Wu et al. .................... 711/162 |
| 7,054,890 | B2 * | 5/2006 | Musante et al. ............. 707/201 |
| 2002/0019874 | A1 | 2/2002 | Borr |
| 2002/0059505 | A1 * | 5/2002 | St. Pierre et al. ............ 711/162 |
| 2003/0112754 | A1 | 6/2003 | Ramani |
| 2003/0140129 | A1 | 7/2003 | Livnat |
| 2004/0215794 | A1 | 10/2004 | Lauer |
| 2004/0260748 | A1 | 12/2004 | Springer |
| 2004/0267932 | A1 | 12/2004 | Voellm |
| 2005/0010670 | A1 | 1/2005 | Greschler |
| 2005/0060442 | A1 | 3/2005 | Beverly |
| 2005/0138528 | A1 | 6/2005 | Ameigeiras |
| 2005/0182850 | A1 | 8/2005 | Kohno |
| 2005/0198113 | A1 | 9/2005 | Mohamed |
| 2005/0262103 | A1 | 11/2005 | Stakutis |
| 2006/0026165 | A1 | 2/2006 | Mohamed et al. |
| 2006/0271692 | A1 | 11/2006 | Kruse et al. |
| 2006/0271697 | A1 | 11/2006 | Kruse et al. |

FOREIGN PATENT DOCUMENTS

| | | |
|---|---|---|
| WO | WO03096646 | 11/2003 |

OTHER PUBLICATIONS

"Atomic Snapshots in O (n log n) Operations," Department of Computer Science, The Technion, Haifa 32000, Israel, pp. 29-40.

Russinovich, Mark and Segall, Zary, "Application-Transparent Checkpointing in Mach 3.0/UX," Department of Computer and Information Science, University of Oregon, (1995), pp. 114-123.

Afek, Yehuda, "Atomic Snapshots of Shared Memory," Journal of the Association for Computing Machinery, vol. 40, No. 4, Sep. 1993, pp. 873-890.

Borowsky, Elizabeth, "Immediate Atomic Snapshots and Fast Renaming," Computer Science Department, University of California, Los Angeles, (1993), pp. 41-51.

Talpey, Tom. "NFSv4 Session Extensions," IETF Standard-Working-Draft, Internet Engineering Task Force, IETF, CH, vol. 1, nfsv4, No. 1, Feb. 2005; pp. 1-68.

Shepler, S.; Callaghan, B.; Robinson, D.; Thurlow, R. "Network File System (NFS) version 4 Protocol, " Sun Microsystems S et al, IETF Standard, Internet Engineering Task Force, IETF, CH, Apr. 2003, pp. 1-275.

"MSRPC Update and SMB Update," May 20, 2004, [2 pages]. http://marc.theaimsgroup.com/?1=nfr-users&m=108509229309130&w=2> (retrieved on Jan. 18, 2006).

Greenberg S, Keene B, "NFILE—A File Access Protocol," IETF Standard, Internet Engineering Task Force, IETF, CH, XP015005976, ISSN : 0000-0003, Dec. 1987, pp. 1-86.

Gu, Yunhong et al. "SABUL: A High Performance Data Transfer Protocol," (Publication date not available), [11 pages].

Pawlowski, Brian et al. "The NFS Version 4 Protocol" (Publication date not available), [20 pages].

Alvisi, Lorenzo et al. "Low-Overhead Protocols for Fault-Tolerant File Sharing," Department of Computer Science, The University of Texas at Austin, May 26-29, 1998, [10 pages].

Hartman, John Henry. "The Zebra Striped Network File System," 1994, pp. 1-148.

Vanwasi, A.K. "Unleashing the power of P2P,"2001, [5 pages].

Hiltunen, Matti et al. "Implementing Integrated Fine-Grain Customizable QoS using Cactus,"1999, [2 pages].

"SMB: The Server Message Block Protocol," 1999, [108 pages].

Pranevich, Joseph. "The Wonderful World of Linux 2.6," 2003, [17 pages].

CIFS http://msdn.microsoft.com/library/default.asp?ur=/library/en-us/cifs/protocol/cifs.asp.

CIFS or Public SMB Information on Common Internet File System http://support.microsoft.com/default.aspx?scid=kb;en-us;199072.

Microsoft SMB Protocol and CIFS Protocol Overview http://msdn.microsoft.com/library/default.asp?urp=/library/en-us/fileio/fs/microsoft_smb_protocol_and_cifs_protocol_overview.asp.

Satyandrayanan, Mahadey et al., *Scalable, Secure and Highly Available Distributed file Access*, Computer, May 1990, pp. 9-21.

Szczerbina, P., *Novell's NetWare Core Protocol*, Dr. Dobb's Journal, Nov. 1993, pp. 123-132.

Morris, J.H., *Andrew: A Distributed Personal Computing Environment*, Communications of the ACM, vol. 29, No. 3, Mar. 1986, New York, pp. 184-201.

Mullender, S.J., *A Distributed File Service Based on Optimistic Concurrency Control*, Proceedings of the Tenth ACM Symposium on Operating Systems Principles, Dec. 1-4, 1985, Orcas island, WA, pp. 51-62.

Linn, J., *Generic Security Service Application Program Interface Version* Version 2, Update 1, RFC 2743, Jan. 2000, http://www.ieft.org/rfc/rfc2743.txt.

Internet Assigned Numbers Authority, *Well-Known Port Numbers*, http://www.iana.org/assignments/port-numbers.

Rivest, R., *The MD5 Message-Digest Algorithm*, RFC 1321, Apr. 1992, http://ietf.org/rfc/rfc1321.txt.

Krawczyk, J. et al., *HMAC: Keyed-Hashing for Message Authentication*, RFC-2104, Feb. 1997, http://www.ietf.org/rfc/rfc2104.txt.

Microsoft Corporation, "Kerberos Protocol Extensions Specification," May 2006, URL TBD.

Klima, V., "Tunnels in Hash Functions: MD5 Collisions Within a Minute," Cryptology ePrint Archive, Mar. 2006, http://eprint.iacr.org/2006/105.pdf.

Zhu, L., Leach, P., Jaganathan, K., and Ingersoll, W., "The Simple and Protected Generic Security Service Application Program Interface (GSS-API) Negotiations Mechanism," RFC-4178, Oct. 2005, http://www.ietf.org/rfc/rfc4178.txt.

Microsoft Corporation, "Microsoft FSCTL Structure Specification," May 2006, "Microsoft FSCTL Structure.doc," URL TBD.

Leach, Paul; Naik, Dilip C., *A Common Internet File System (CIFS/1.0) Protocol*, Draft-leach-cifs-v1-spec-02, Mar. 13, 1997, http://www.microsoft.com/mscorp/ip/protocols/BSTD/CIFS.

The Zebra Striped Network File System (Scientific Paper), John Henry Hartman, Publication Date: 1994, http://www.cl.cam.ac.uk/Research/SRG/netos/plana/dump/zebra.pdf.

SMB: The Server Message Block Protocol (Scientific Paper), Christopher R. Hertel, Publication Date: Jun. 8, 1999, (http://www.opencontent.org/openpub/), http://ubiqx.org/cifs/SMB.html.

Seattle, Washington, Publication Date: Jul. 12-15, 1999, pp. 123-134, http://www.usenix.org/publications/library/proceedings/usenix-nt99/full_papers/almeida/almeida_html.

Inside Microsoft Networking (Scientific Paper), Andrew Tridgell, Publication Date: Jun. 25, 1998, http://public.www.planetmirror.com/pub/sage-au/Conference-Papers/sage-au98/tridgell/tridgell.ps.

Leach, et al., "CIFS/E Browser Protocol," Internet Working Group, Jan. 10, 1997. (draft-leach-cifs-browser-spec-00.txt).

Leach, et al., "CIFS Logon and Pass Through Authentication," Internet Working Group, Jan. 3, 1997. (draft-leach-cifs-logon-spec-00.txt).

Leach, et al., "CIFS Printing Specification," Internet Working Group, Jan. 31, 1997. (draft-leach-cifs-print-spec-00.txt).

Leach, et al., "CIFS Remote Administration Protocol," Internet Working Group, Feb. 26, 1997. (draft-leach-cifs-rap-spec-00.txt).

Leach, et al., "A Common Internet File System (CIFS/1.0) Protocol," Internet Working Group, Mar. 13, 1997. (draft-leach-cifs-v1-spec-02.txt).

Aboba, B. et al. "Extensible Authentication Protcol (EAP)," RFC 3748, Jun. 2004, [63 pages].

Asokan N., Tsudik, G. and Waidner, M. "Server-supported signatures," Journal of Computer Security, 1997, pp. 1-13.

Bell Labs. Plan 9 Default Fossil File System [online]. Manual page, 2002, [retrieved on Sep. 17, 2007]. Retrieved from: http://plan9.belllabs.com/magic/man2html/4/fossil.

Bensaou, Brahim, et al. "Credit-Based Fair Queuing (CBFQ): A Simple Service-Scheduling Algorithm for Packet-Switched Networks," IEEEIACM Transactions on Networking vol. 9 Issue 5 (Oct. 2001) pp. 591-604.

Common Internet File System (CIFS) Technical Reference, Revision: 1.0 [online]. SNIA, Released Mar. 1, 2002, [150 pages]. Retrieved from: http://www.snia.org/tech_activities/CIFS/CIFS-TR-1p00_FINAL.pdf.

Dehaese, Gratien. The ISO 9660 File System, May 1995, [9 pages]. Available at: http://users.pandora.be/it3.consultants.bvba/handouts/ISO9960.html.

Financial Institution Message Authentication (Wholesale). Financial Services Technical Publication Developed by Accredited Standards Committee X-9 Financial Services, ANSI X9.9-1986, Reaffirmation of X9.9-1986, Aug. 15, 1986, pp. 1-25.

Fossil (File System) [online]. Wikipedia [retrieved Sep. 14, 2007]. Retrieved from: http://en.wikipedia.org/wiki/Fossil_%28file_system%29#External_links.

Gifford, David et al. The Cedar File System. Communications of the ACM, vol. 31, No. 3, Mar. 1988, pp. 288-298.

Hertel, C. Implementing CIFS: Common Internet File System [online]. CIFS [retrieved Sep. 14, 2007]. Retrieved from: http://ubiqx.org/cifs/.

Hitz, David, et al. "File System Design for an NFS File Server Appliance," NetApp, [retrieved Jul. 18, 2007], pp. 1-13. Available at: http://www.netapp.com/library/tr/3002.pdf.

Hobbit. "CIFS: Common Insecurities Fail Scrutiny," Avian Research, Jan. 1997, pp. 1-39. Available at: http://web.textfiles.com/hacking/cifs.txt.

IBM Personal Computer Seminar Proceedings. The IBM PC Network Program, vol. 2, No. 5, Sep. 1984, pp. 23-34.

Introduction to RSX-11M version 4.2. Digital Equipment Corporation, Jul. 1985, pp. 1-116.

ISO/IEC: Banking—Approved Algorithms for Message Authentication—Part 1: Data Encryption Algorithm (DEA). ISO/IEC 8731:1987, pp. 1-4.

Kent, S. and Atkinson, R. "Security Architecture for the Internet Protocol," RFC 2401, Nov. 1998, [62 Pages].

Kent, S. et al. "IP Authentication Header," RFC 2402, Nov. 1998, [21 Pages].

Murphy, Dan. "Origins and Development of TOPS-20" 1989, [28 pages]. Available at: http://www.linique.com/dlm/tenex/hbook.html.

National Institute of Standards and Technology: Computer Data Authentication (Federal Information Processing Standards (FIPS) Publication 113; May 30, 1985, pp. 1-9. Also available at: http://www.itl.nist.gov/fipspubs/fip113.htm.

Opening Windows to a Wider World [online]. SAMBA [retrieved on Jul. 13, 2007]. Retrieved from: http://us4.samba.org/samba/(1992).

Protocols for X/Open PC Interworking: SMB, Version 2. The Open Group, Sep. 1992, [534 pages].

RSX-11M/M-PLUS; RMS-11 User's Guide. Digital Software, Apr. 1983, [186 pages].

Rubin, Frank. "Message Authentication Using Quadratic Residues," (Cryptologia XIX(4); Oct. 1995, pp. 1-6.

Satran, J. et al. "Internet Small Computer Systems Interface. (iSCSI)," RFC 3720, Apr. 2004, [240 pages].

Soules, Craig et al. Metadata Efficiency in a Comprehensive Versioning File System. School of Computer Science, Carnegie Mellon University, May 2002, pp. 1-33.

The Java CIFS Client Library [online]. CIFS, [retrieved Jul. 13, 2007]. Retrieved from: http://jcifs.samba.org/.

Tichy, Walter F. "RC S -A System for Version Control," Software—Practice & Experience 15(7), Jul. 1985, pp. 637-654. Available at: http://www.cs.purdue.edu/homes/trinkle/R CS/rcs.ps.

TOPS-20 [online]. Wikipedia, [retrieved on Mar. 4, 2007]. Retrieved from: http://en.wikipedia.org/wiki/TOPS-20.

Volume and File Structure for Write-Once and Rewritable Media using Non-Sequential Recording for Information. ECMA: Universal Disk Format (UDF) File System. Standard ECMA 167, Jun. 1997, pp. 1-150.

Schneier, B., *Applied Cryptography Second Edition*, John Wiley & Sons, Inc., 1996.

Almedia, D., *FIFS: A Framework for Implementing User-Mode File Systems in Windows NT*, USENIX, © 1999.

European Search Report RS113279/US18298905, Jan. 20, 2006.

European Search Report RS113280/US18225105, Jan. 20, 2006.

Hiltunen, M., Schlichting, R., Wong, G., *Implementing Integrated Fine-Grain Customizable QoS using Cactus*, 1999.

Howard et al., *Scale and Performance in a Distributed File System*, ACM Transactions on Computer Systems, vol. 6, No. 1, Feb. 1988, pp. 51-81.

IBM PC Network Technical Reference No. 6322916, Sep. 1984.

Leach, P., Naik, D., *A Common Internet File System (CIFS/1.0) Protocol Preliminary Draft* [online], Dec. 19, 1997. Retrieved from: http://tools.ietf.org/html/draft-leach-cifs-v1-spec-01.

*CIFS Oplock File Locking*, MSDN, [Retrieved Jan. 7, 2008], Retrieved from: http://msdn2.microsoft.com/en-us/library/aa302210.aspx.

MSPRC Update (Version 11) and SMB Update (Version 3).

Pranevich, J., *TheWonderful World of Linux 2.6* [online], 2003, [Retrieved Dec. 2005], Retrieved from: http://www.kniggit.net/wwol26.html.

Samba Team, *The Samba Team are pleased to announce Samba1.9.18* [online], Jan. 7, 1998, [Retrieved Jan. 4, 2008], Retrieved from: http://de.samba.org/samba/history/samba1.9.18.html.

*The Server Message Block Protocol* [online], 1999, [Retrieved Jun. 5, 2006], Retrieved from: http://ubiqx.org/cifs/SMB.html.

Shepler, S., *NFS Version 4 Design Considerations* [online], RFC 2624, Jun. 1999, [Retrieved Jan. 4, 2008], Retrieved from: http://tools.ietf.org/html/rfc2624.

SNIA, *Common Internet File System (CIFS) Technical Reference* [online], Mar. 1, 2002, Retrieved from: http://www.snia.org/tech_activities/CIFS/CIFS-TR-1p00_FINAL.pdf.

Srinivasan, V., Mogul, J., *Spritely NFS: Implementation and Performance of Cache-Consistency Protocols* [online], May 1989, [Retrieved Jan. 4, 2008], Retrieved from: http://www.hpl.hp.com/techreports/Compaq-DEC/WRL-89-5.pdf.

AFS and DCE/DFS caching (No Document), Dec. 22, 2008.

Sun's Solaris Operating System Resource Manager (No Document), Dec. 22, 2008.

*Samba—opening windows to a wider world* [online], [Retrieved Jul. 13, 2007], Retrieved from: http://us4.samba.org/samba/samba.

* cited by examiner

SYSTEM AND METHOD FOR PROVIDING ACCESS TO CONSISTENT POINT-IN-TIME FILE VERSIONS

FIELD OF THE INVENTION

The present invention relates generally to computers and files, and more particularly to the recovery of file information.

BACKGROUND OF THE INVENTION

Users lose files or the data within files in many ways. One common way is by accidental deletion of a file. Contemporary operating systems offer "recycle bin" functionality or the like allows some files to be recovered, however not all mechanisms that delete files do so by moving them to the recycle bin. Further, even when deleting files with recycle bin-enabled mechanisms, those mechanisms allow for files to be permanently deleted, without being put in the recycle bin, e.g., by using Shift-Delete instead of the Delete key.

Another common way that users lose information is by accidentally overwriting a file. For example, users often create a new file by opening an existing file, making modifications to it, and then saving the file with a new name. However, if the user forgets to save the file using a new name, the original file data is overwritten. As can be readily appreciated, the presence of a recycle bin does nothing to protect against this type of data loss.

Yet another common way that users lose information is not by mistake, but by sharing files with others who make changes. For example, during the normal course of working on a document, multiple users may make changes to that document at various times. At a later time, a user may want to have a copy of what the document contained before one or more colleagues altered it.

Although various backup mechanisms exist, they do not solve these problems in many cases. For example, if the backup was performed too long ago, the file may not exist. Additionally, even if a backup copy exists, it may be difficult or not worthwhile to recover. For example, corporate policy may prevent the information services department from performing a single file restore, or there may be a large cost charged to recover a document, which the user's department will not accept. Further, a user may decide (e.g., out of embarrassment or apprehension) that it is better to work overtime to recreate a document as best as possible than it is to have the loss of the document publicized.

Similarly, although versioning systems exist that keep versions of volumes, such versioning systems are not easy to use. For example, such systems simply maintain an image of a network shared folder subtree and the files therein at a given time, with subtree images kept for various times. To find a file version, a user needs to navigate through a selected subtree. Then, if the file existed at the time the subtree image was preserved, but it is not the desired version, or the user is uncertain which exact version is best, the user may have to navigate back up to folder that keeps the subtrees and then back down through one of the other available subtree images, repeating for some or all of the subtrees until the desired version is found. In fact, depending on how often the images are preserved, many of the file versions may be the same as other versions, yet until the user navigates to each one, the user may not know that a particular file version need not be checked. Moreover, such navigation gets even more complicated with distributed file systems, wherein the subtrees may be distributed across multiple file servers. For example, navigation may not be as simple as going up a chain of parent folders or down to child folders, since the server identity may change as subtrees are changed.

In sum, files and/or their information may be lost in many ways, yet in many cases, users do not have the ability to easily correct such problems, and instead have to resort to costly or difficult alternatives.

SUMMARY OF THE INVENTION

Briefly, the present invention provides a system and method that automatically and transparently enable access to prior file or folder versions when a file or folder is identified. To this end, prior versions are automatically located for a selected file or folder (of files), and the available prior versions displayed in response, to enable selection of one for restoration. When one of the prior file or folder versions is selected, the data is accessed, whereby the user can easily restore a file or folder and thereby recover from changes or deletions. The present invention can be implemented using remote file servers, or with local file system volumes.

In one implementation, a version location process locates and provides access to consistent point-in-time versions for network shares, maintained in shadow volumes on a remote file server. The file version location process allows customers to view the contents of network files or folders as they existed at points of time in the past, which greatly simplifies file data recovery.

More particularly, a user can request the version location process through a shell user interface that enables the user to request I/O operations on enumerated files or folders. For example, if a user views the files in a folder hosted on a remote server, a task or command appears enabling the user to retrieve prior versions of a selected file or folder. Selecting this task causes an application programming interface or the like to communicate with the server to obtain the file's or folder's history, comprising a list of read-only, point-in-time shadow copies of the file or folder contents.

In a described implementation, a timestamp identifying each shadow volume is returned when a file or folder is selected for version recovery. The individual volumes can be queried for file attribute information, such that the list can be filtered, whereby the user can select from a list that identifies files and folders that actually exist on shadow volumes. Filtering non-unique files can also be performed, so that the user sees only one version rather than multiple unchanged versions that may be available.

Once the user (or requesting entity) is provided with the list of available versions, a timestamp-identified version can be selected from the list, e.g., by user selection, whereby the selected version will be restored (e.g., opened and read). In this manner, prior file or folder versions can be restored simply, rapidly, and with minimal expense.

Other advantages will become apparent from the following detailed description when taken in conjunction with the drawings, in which:

DETAILED DESCRIPTION

Exemplary Operating Environment

Figure 1:
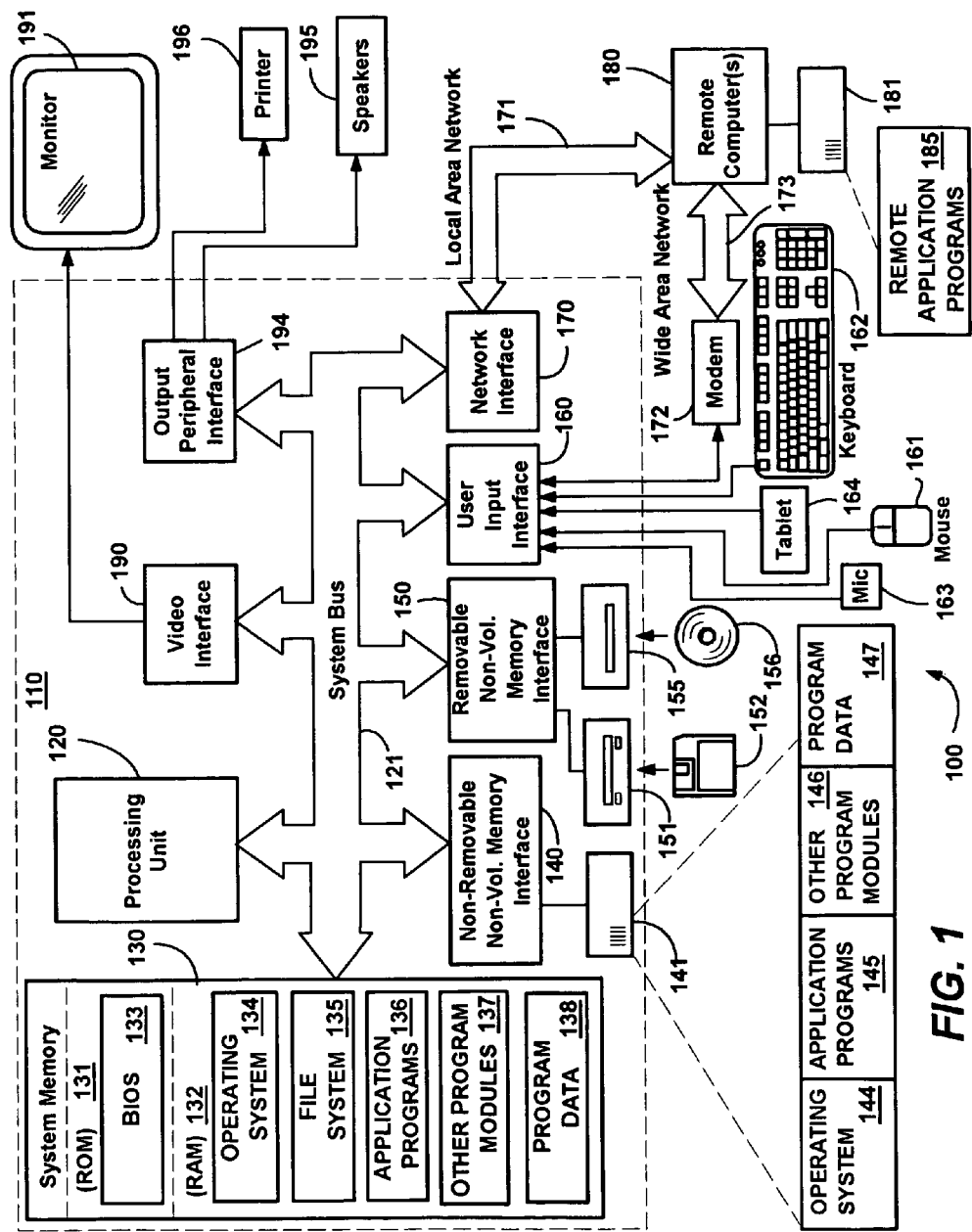
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available storage media that can be accessed by the computer 110 and includes both volatile and nonvolatile storage media, and removable and non-removable storage media. By way of example, and not limitation, computer-readable media may comprise computer storage medium. Computer storage medium includes both volatile and nonvolatile storage medium, removable and non-removable storage medium implemented in any method or technology for storage of information such as computer-readable instructions, data structures, program modules or other data. Computer storage medium includes, but is not limited to, RAM, ROM, EEPROM, flash memory or other memory, CD-ROM, digital versatile disks (DVD) or other optical disk storage, magnetic cassettes, magnetic tape, magnetic disk storage or other magnetic storage devices, or any other storage medium which can be used to store the desired information and which can accessed by the computer 110. Communication media typically embodies computer-readable instructions, data structures, program modules or other data in a modulated data signal such as a carrier wave or other transport mechanism and includes any information delivery media. The term modulated data "signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, file system 135, application programs 136, other program modules 137 and program data 138.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 136, other program modules 137, and program data 138. Operating system 144, application programs 145, other program modules 146, and program data 147 are given different numbers herein to illustrate that, at a minimum, they are different copies. A user may enter commands and information into the computer 20 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Accessing Consistent Point-in-Time File Versions

The present invention will be generally described in the context of Microsoft Corporation's Windows® XP operating system, using the NTFS file system and the CIFS (Common Internet File System) remote file-access protocol. Notwithstanding, it can be readily appreciated that the present invention may be implemented with virtually any operating system and/or file system and/or protocol. Further, the present invention will be described with respect to a network file server, wherein CIFS runs over TCP/IP, however it is understood that the present invention is independent of a network, and can be implemented with local storage.

In general, the present invention is directed to an improved system and method for making various file or folder versions easily accessible to a user, whereby many of the problems with data and file loss are eliminated, or at least significantly mitigated, and the cost of data recovery substantially reduced. As can be readily appreciated, the present invention is thus based on having one or more different versions of files and/or folders available, each version maintained in some manner on some non-volatile storage mechanism. However, the present invention is not limited to any particular way in which the various versions are maintained, but rather can work with virtually any such system.

For purposes of explanation, the present invention will be generally described with an example in the Windows® NTFS file system, wherein the state of a file system volume may be preserved at various points in time, such as times chosen by an administrator or the like. In one example implementation, as described in U.S. patent application Ser. No. 09/505,447, assigned to the assignee of the present invention, NTFS allows the capturing of the state of a file system volume (in a temporal shadow volume) at various times and/or frequencies, such as once per hour, once every night, or any other suitable schedule that an administrator or the like establishes, based on an enterprise's policy criteria such as the amount of storage available, the perceived need for preserving the state, and so on. In this manner, any part of that volume, such as a specified file, (a shadow copy), can be recovered. Moreover, the administrator or policy can determine when a temporal shadow volume no longer needs to be kept so that the storage space can be reclaimed.

While logically an entire volume may be preserved at the time of capture, instead of physically preserving the entire volume, NTFS efficiently maintains a set of differential files that, when taken together, can recreate the state of a volume at the time of the capture, (provided the captured volume is still kept). To maintain the changes, whenever a region the base volume is modified following a capture, such as when existing data is to be first overwritten with new data, the existing base volume's data is first copied to the differential file associated with the latest temporal shadow volume, e.g., on a per-allocation unit basis before overwriting the data.

Note that because of the way in which the differential files are read, only the most recent differential file needs to be written to actively track the changes written to the current (base) volume after a capture occurs. To this end, by reading data from each differential file (corresponding to a temporal shadow volume) in an ordered manner until a change is found, or if no change is found, by reading from the base volume, the data as it existed at the time of any capture operation can be reconstructed. More particularly, when a request to read a region of a selected temporal shadow volume is received, a shadow volume manager first determines (e.g., on a per-allocation unit basis) whether data associated with the region is stored in the selected temporal shadow volume's associated differential file. If the existing data is in the differential file, that data is returned to the reading process. If not, the reading continues by accessing each differential file associated with subsequent temporal shadow volumes in temporal order from the earliest following the selected temporal shadow volume to the latest that exists, until either the data is found in a differential file (as this reflects the proper state) or no later temporal shadow volumes (differential files) remain. If none remain, then the data is read from the base volume, as it has not changed since the selected time of capture and the base volume still has the proper state.

Thus, for a selected file of multiple allocation units, the data accumulated from the various differential files or the base volume on a per-allocation unit basis is reconstructed and returned to the process that requested the read of the file data from the selected temporal shadow volume. As can be appreciated, this process can thus reconstruct a file or folder as it existed on a volume at the time any existing shadow volume was captured. Moreover, because this reconstruction process is generally at the file system level, a user mode application or the like sees the shadow volumes as if they were actual physical volumes, and can thus request files therefrom in a normal manner.

In order to find versions for a file on the various shadow volumes, an application programming interface (API) has been added to the API layer so that existing applications and the like can transparently work with shadow volumes. For example, a drive letter or other string may be mapped to a shadow volume, whereby an application can access files thereon via the drive letter. As can be readily appreciated, however, instead of implementing such functionality at the API layer, the present invention may be alternatively implemented in an application program, or in one or more components below an application program, or partially in both.

Figure 2:
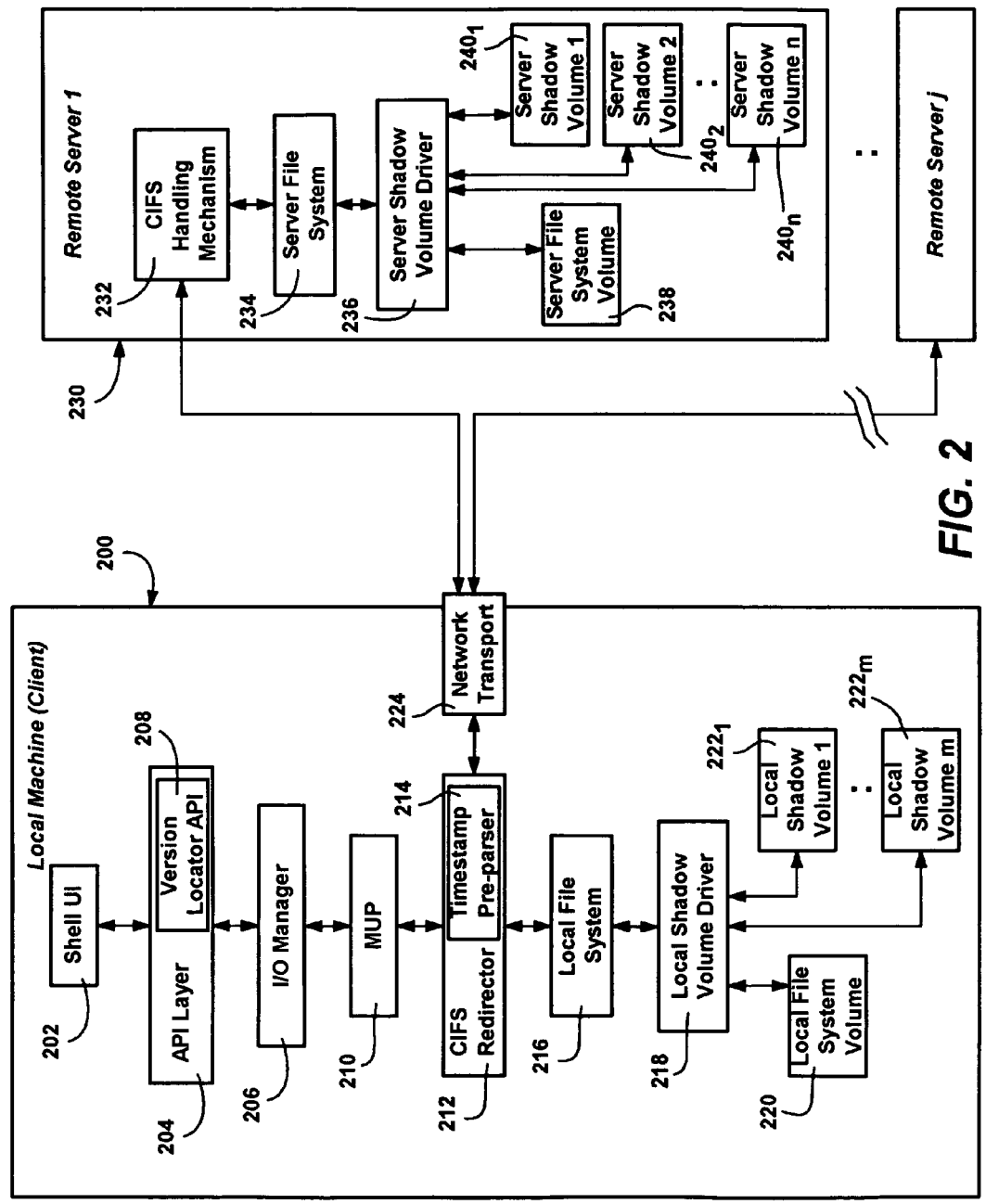
FIG. 2 is a block diagram generally representing components for implementing file or folder version location, including with prior versions maintained on a remote server, in accordance with an aspect of the present invention.

Turning to FIG. 2 of the drawings, there is shown a local machine 200 (such as corresponding to the computer system 110 of FIG. 1) including a shell user interface 202. The shell user interface 202 displays the hierarchical structure of files, folders, and drives on a local or remote computer, and provides a user with access to those drives, folders and files. For example, in the Windows® 2000 and Windows® XP operating systems, one such shell user interface is referred to as "Windows Explorer," which can be executed in many ways, including by clicking on a shortcut, typing a drive letter and/or path via a command "Run" prompt or browser component, and so on.

As is known, through this user interface 202, a user can perform input-output (I/O) operations directed to files, such as to open files by double-clicking on a selected filename, or select one of many options (e.g., open, print, copy, rename, set and/or retrieve properties) by right-clicking on the filename. Note that instead of the shell user interface 202, any other suitable user interface or entity would suffice. For example, such user interfaces to access files, their properties and metadata are often conveniently provided in an application program, such as contemporary word processing programs. Thus, in general, the present invention is not limited to accessing file or folder versions via a shell UI and/or via a right-click and select option, but rather contemplates any manner of automatically locating and providing access to earlier versions.

To access file data and/or file metadata in a described implementation, the shell UI 202 places application programming interface (API) calls via an API layer 204 to an I/O manager 206. In general, when an API call reaches the I/O manager 206, the I/O manager 206 provides an I/O request packet (IRP) containing information about the request, e.g., including its type and the filename or file handle, and passes the request to a driver stack.

IRPs directed to local files are received by a local file system driver 216, which may be further processed by a local shadow volume driver 218 or the like, for accessing files on a local file system volume 220 and/or local shadow volumes $222_1$-$222_m$. Accessing local file or folder versions will not be described in detail herein, as instead the present invention will be described with respect to remote file version location. Nevertheless, as will be apparent, the present invention is independent of where the prior versions are located.

For accessing network files (and other resources), the shell UI 202 (or similar application) can place a file I/O API call directed to a network resource on a remote server 230, (e.g., the remote computer 180 of FIG. 1). Such calls are initially recognized as remote because they identify a remote server share, such as with a UNC (Uniform Naming Convention) name, e.g., server1/share2, or via a drive letter or the like previously mapped to a network shared folder or the like. When such calls are first received, a Multiple UNC Provider, or MUP 210, operates to figure out which network redirector component can handle the call, and therafeter provides the IRPs directed to that resource to the appropriate redirector. For example, the present invention will redirect CIFS calls to a CIFS-capable server identified by a UNC name or the like, via a CIFS redirector 212 that redirects the calls to the network via a network transport 224 or the like. Note that CIFS is a published extension to the well-known SMB (server message block) protocol; the general model for implementing redirectors is described with reference to an SMB redirector, along with IRPs and the I/O manager, in the reference entitled, *Inside Microsoft® Windows®* 2000, Third Edition, D. Solomon and M. Russinovich, Microsoft Press (2000).

Thus, to access remote file data and/or file metadata in a described implementation, whether a current version or a captured version on a temporal shadow volume, the IRPs to a CIFS server are received and handled by the MUP 210 and/or CIFS redirector 212, whereby they are received by a CIFS handling mechanism 232 in the server 230. For purposes of this example description, essentially the CIFS handling mechanism 232 can be logically thought of as the process that unpacks CIFS requests and converts them to file system requests that are appropriate for the remote server's file system 234, e.g., by similarly generating an IRP, such as by placing an API call to an I/O manager or the like on the server (not separately shown).

In general, file system operations that are directed to the server's current (base) volume 238 pass through the server shadow volume driver 236 unchanged, while operations that are directed to one of the temporal shadow volumes $240_1$-$240_n$ are handled by the server shadow volume driver 236. For example, in an NTFS differential file implementation, the volume locations (e.g., clusters) specified by the server file system 234 are modified as necessary to emulate the existence of the volume as it existed at an earlier capture time. For example, as described above, to satisfy a file read request of a file on a shadow volume, the shadow volume driver 230 walks through the various volumes' associated differential files, and if necessary the base volume, to reconstruct the file from the preserved allocation units that made up the file, as those allocation units existed when the file was captured. The CIFS handling mechanism 232 receives, packages and returns the result (e.g., the read data for a read, a file handle for an open request and so on) to the CIFS redirector 212 on the local machine, which then passes the appropriate information back up the stack to the I/O manager 204 for properly responding to the call.

In accordance with one aspect of the present invention, one of the options for a file selected via the shell UI 202 or the like comprises automatically obtaining a list of corresponding earlier file versions, e.g., ones that exist on temporal shadow volumes as described below, from which file data as it existed earlier may be recovered. In this manner, a user is not required to navigate the various volumes and subtrees to find captured versions (shadow copies) of a file, but rather can simply request the version location operation on a selected file and receive a list comprising a set of the available versions. To this end, in a described implementation, calls directed to versioning are handled via a version locator API 208. Again, note that a utility or other similar component can implement the present invention instead of an API.

Note that for files that have been deleted, the user can recover the file by obtaining prior folder versions. Alternatively, a user can simply create an equivalent filename, such as via an application program, and then right click on the filename to find the versions. As another alternative, it is feasible to integrate the present invention with a search mechanism that looks for user-provided matching properties of a file or folder version, such as if the user cannot remember a name exactly, but wants to restore a version of it. As used herein, a selected file or folder can be selected by any means of selection.

For purposes of simplicity herein, the present invention will be described with respect to recovery of a file rather than a folder, except where otherwise noted. As will be understood, however, folder recovery can be implemented in essentially the same way.

Figure 3:
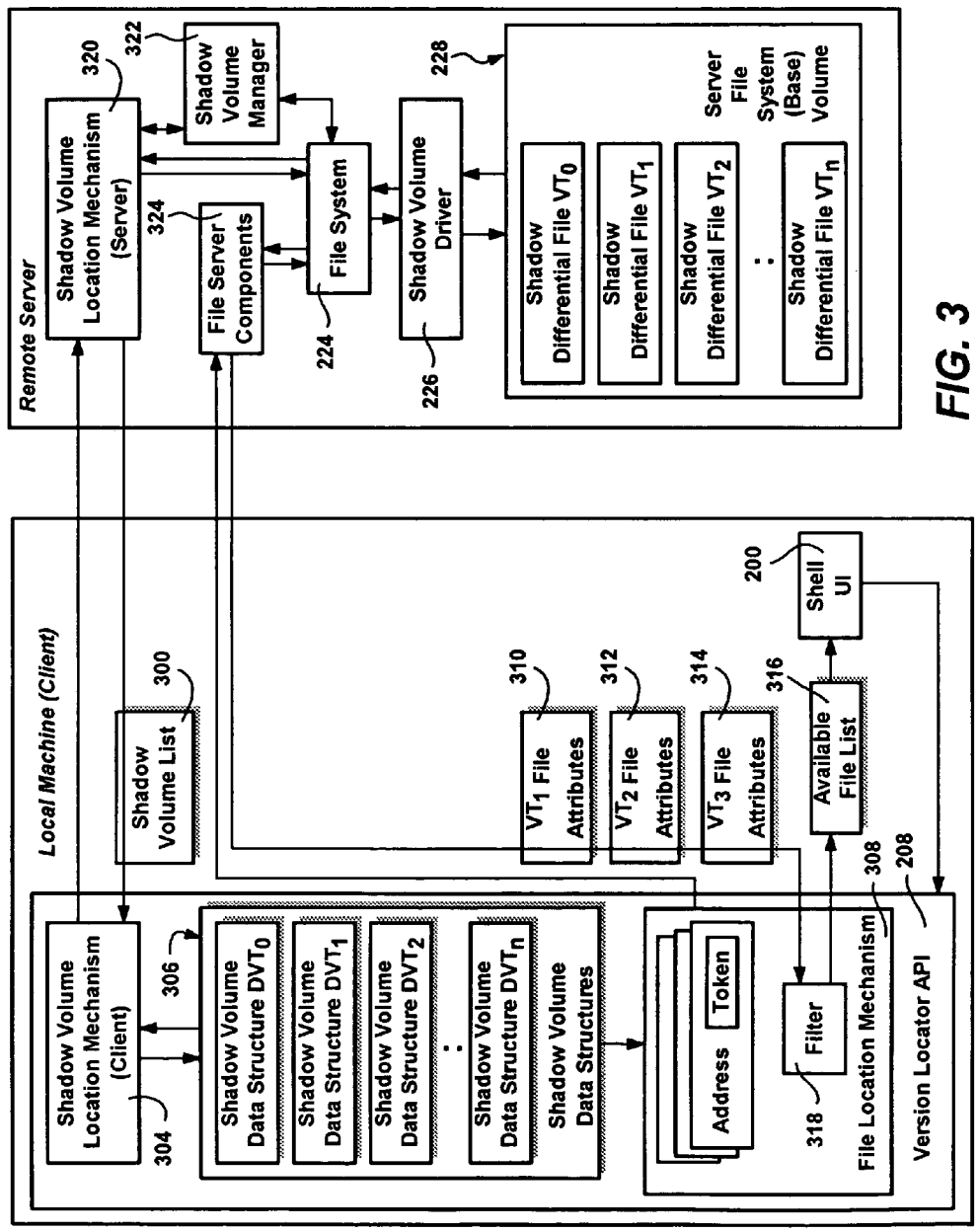
FIG. 3 is a block diagram generally representing one implementation for implementing file versioning with files having prior versions maintained on shadow volumes on a remote server, in accordance with an aspect of the present invention.

To handle a call corresponding to a user request for a list of the previous file versions captured or otherwise available for a particular file, in one described implementation, as generally represented in FIG. 3, locating the file versions is accomplished by first obtaining at the local (client) machine a list 300 of the available shadow volumes. To this end, the version locator API 208 includes or is otherwise associated with a client-side shadow volume location mechanism 304, which communicates with a counterpart server-side volume location mechanism 320 to obtain the list 300 of the temporal shadow volumes. For example, in the CIFS protocol, an escape mechanism referred to as "transact" enables a local machine to send such a specialized request to an appropriately enabled CIFS-server, which then handles the request via suitable code installed thereon, which in the present example comprises the server-side shadow volume location mechanism 320.

To provide the list for a given file, the server-side shadow volume location mechanism 320 communicates with the server file system 230 and a shadow volume manager 322 to obtain the various shadow volumes' information, such as their names, timestamps, and a handle to each volume. To this end, the server-side shadow volume location mechanism 320 first determines the share that the file is on, and then determines which volume the share is on. Then, the shadow volume manager 322 is asked to return information (e.g. a timestamp) for the identified base volume (e.g., 228) for each shadow volume that has been captured therefor. If any shadow volumes exist, this information is then returned in the shadow volume list 300.

Note that as shown in FIG. 3, the shadow volumes are logical volumes, not physically separate volumes, as they are actually maintained as NTFS differential files $VT_0$-$VT_n$ representing changes to the volume at various times, from which any file on the volume can be reconstructed as it existed at the time of capture. However, as can be readily appreciated, obtaining the information for volumes captured in other ways is a straightforward operation. Moreover, it is feasible to have the server collect file attributes for the file versions from the differential files, rather than have the timestamps separately returned first, however keeping server operation simple and shifting as much of the burden to the client is generally desirable.

With the returned shadow volume list 300, the version locator API 208 can now find out which remote temporal shadow volumes have files that correspond to the user-selected one. For efficiency, the client-side shadow volume location mechanism 302 maintains a set of data structures 306, that each hold the information about an available shadow volume copied from the list 300. Because the temporal shadow volumes that are available regularly change, e.g., when a new one is captured and/or an old one is discarded, the client-side shadow volume location mechanism 304 updates this set 306 as necessary whenever a shadow volume list 300 is received. Note that in addition to the information returned in the shadow volume list 300, the data structures $VT_0$-$VT_n$ may also maintain the UNC path to the network share, whereby it can construct a path to each file.

At this time, the timestamps can be used to generate a timestamp-based list 316 returned to the shell user interface 202 for display to the user. At least two options, however, provide the user with the ability to have a more-focused result, namely only a list of timestamps that actually have a version of the file, and/or only file versions that are unique, i.e., different from other versions. Of course, either or both of these user options need not be offered to the user, but the flexibility is provided for various alternatives. For example, instead of providing a user with the list of timestamps, the user can alternatively specify a time, whereby the closest version, (before or after, or simply closest), or the two surrounding versions, can be automatically located for the user. As can be appreciated, numerous other ways of providing versions to a user are feasible.

If a more-focused result is desired, for each shadow volume that exists, the version locator API 208, via a file location mechanism 308, sends a CIFS request to retrieve the file's attributes as they exist on that shadow volume. As is known, CIFS file server components 324 handle such requests in general. However, in order to handle requests directed to a shadow volume, the client and server have been modified to include the timestamp with the request. More particularly, in one implementation, the file location mechanism 308 embeds a time token comprising the volume's timestamp in the request address, e.g.:

//server/share/dir/@GMTmmddyyyyhhmmss/foo.txt so that the server is aware of the shadow volume request and knows the shadow volume to access. Note that the timestamp is a GMT (Greenwich Mean Time) timestamp, whereby time zone changes do not affect such a request. Further, note that the timestamp is appended to the end of the path, whereby the client need not deal with distributed file system (DFS) issues related to having files stored on multiple servers. Note that this is because in general, DFS is a system of building a single, unified namespace out of many different servers. At a high level, DFS works by letting the individual servers that comprise the DFS namespace modify client-supplied names in response to junction points. By way of example, DFS may be used to provide a single namespace for a program's releases built by different servers throughout a division, e.g., the name \\progbuilds\release\lab01\release\x86fre is a junction point to \\robsvbl1\release. To open \\progbuilds\release\lab01\release\x86fre\latest_tested_build.txt, the \\progbuilds server will modify the name to \\robsvbl1release\latest_tested_build.txt and tell the client to try the request again.

As can be appreciated, the general algorithm to handle a junction point modifies the left part of the name. A name can traverse multiple junction points, resulting in multiple name revisions, before finally contacting the destination server. Thus, if the shadow copy identifier was to the left, then it would get changed by this process of modifying the file name in response to DFS junction points. In keeping with one aspect of the present invention, putting the identifier to the right allows the identifier to remain in the name even as the servers change the client-supplied name to handle the junction points.

As described above, such a file request is received by the client-side redirector 212 (FIG. 2). In one implementation, the redirector 212 includes a timestamp pre-parser 214 that detects the "@GMT" token, and flags the request (e.g., by setting a bit in the CIFS header) as special, whereby the server's CIFS component 324 will handle the request differently, i.e., as a request directed to a shadow volume and not the base volume, as described below. Note that instead of such an embedded token-type mechanism, the timestamp information may be sent in many other ways, e.g., passed in a header or other field to the server.

In the embedded token implementation, when received at the server, such specially-flagged requests are parsed by the file server components 324, and the timestamp in the token converted to an integer or the like that identifies the actual logical shadow volume, e.g., maps to a shadow volume handle thereto. Note that the flag usage keeps the server efficient, since the server can quickly handle non-special requests without parsing, and only parse the special versioning-related ones, which should be a relatively rare occurrence since version recovery normally will be requested only rarely. Further note that the client can perform the timestamp-to-integer conversion, and pass the integer, whereby the server would not have to parse and convert the token.

For a file version that exists on a shadow volume, the server returns the file attributes, represented in FIG. 3 by file attributes 310, 312 and 314. Not all shadow volumes will necessarily have a copy of the file, e.g., a file may have been initially created after an existing shadow volume was captured, or the file could have been deleted prior to a given capture, whereby that existing shadow volume will not have a version of that file. For files that exist, the file location mechanism 308 adds the file attributes to an available file list 316, in association with the volume's timestamp. As can be appreciated, however, in one alternative implementation, the server can perform such filtering before even returning the shadow volume list 300, that is, only add a shadow volume timestamp to the list 300 if the file exists on that shadow volume.

To simplify the selection by a user, the file location mechanism 308 further includes a unique file filtering process 318 that (if active) checks the file's last modified time (one of the file's returned attributes) so as to not add file versions to the list when those versions have not changed from one already on the list. As described above, checkboxes or the like on the shell UI may be used to make the optional features user-configurable. For example, a user may not want unique-file-only filtering but instead want a different volume's version if a shadow volume's data for this file is corrupt, and thus filtering can be turned off to provide access to such "duplicate" files. Again, in an alternative implementation, if suitable notified, the server can perform such unique filtering before even returning the shadow volume list 300, that is, only add a shadow volume timestamp to the list 300 if the file is unique.

The shell UI 202 receives the list 316, e.g., all at once or as attributes are received, and displays the list to the user. In general, the displayed result comprises the name and timestamp for the file, although of course for the various versions the name is the same and thus need not be repeated, and the timestamps can be converted to local times.

At this time, the user has simply clicked on a filename in the shell UI, requested the file versioning operation, and has automatically and transparently received a list of timestamp-delineated, temporal shadow volumes for that file, which may be filtered to those that have file versions that exist and/or are unique.

From the resultant timestamps displayed in the UI 200, the user can select a version for restoration, which essentially comprises opening and reading the file. Once a selection is made, the list 300 of volume timestamps are discarded, since the set of shadow volumes are capable of changing at any time, and thus the list 300 may no longer be current. However, it is feasible to cache this list 300 and the list 316 (e.g., for a short time) and assume that no new shadow volumes have been captured, and instead deal with the situation of a formerly present (but now missing) shadow volume only when such an event actually occurs.

Data retrieval is substantially the same as for any network file server, although again the CIFS header is flagged and the timestamp included in the token embedded in the path (or otherwise sent) so that the server will parse the address for the token and convert the timestamp to the correct volume location for the file. Note that shadow volumes are read-only, however the user can save a retrieved file to a different, non-shadow volume for editing. In the above-described manner, a user can thus rapidly identify and retrieve a version that exists in a shadow volume for a given file, and then evaluate and keep the version or versions that the user deems best.

It should be apparent that the present invention works with folders generally the same way as described above with respect to files, since folders generally have the same attributes as files. For example, a user can select a folder, and see the various versions that exist of that folder. Then, if the user elects to view a network folder hosted on a remote server with shadow volumes, the user will be able to retrieve prior versions of files within that folder. In other words, selecting such a task will present the user with the folder's history, comprising a list of read-only, point-in-time shadow copies of the folder contents that the user can then open and explore like any other file folder, e.g., the user can view files in the folder's history, copy files from the folder's history, and so on. Thus, for example, where multiple files have been changed, an entire directory can be retrieved and restored. This is also possible with entire volumes. Notwithstanding, for purposes of simplicity, the present invention will continue to be primarily described with respect to the location and restoration of individual files.

Figure 4:
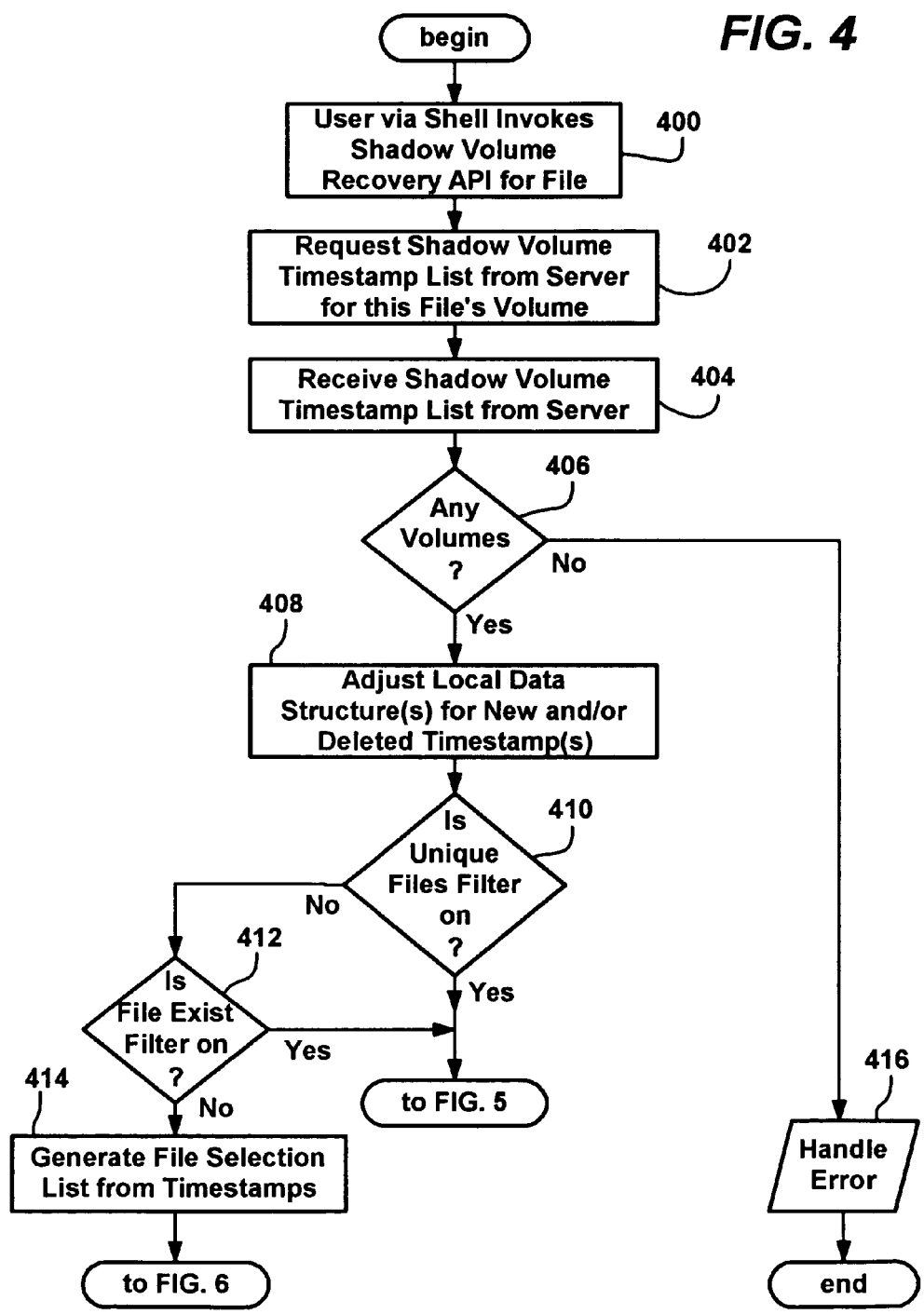
FIGS. 4-6 comprise a flow diagram describing general logic for implementing the present invention to perform file versioning operations in accordance with an aspect of the present invention.
Figure 5:
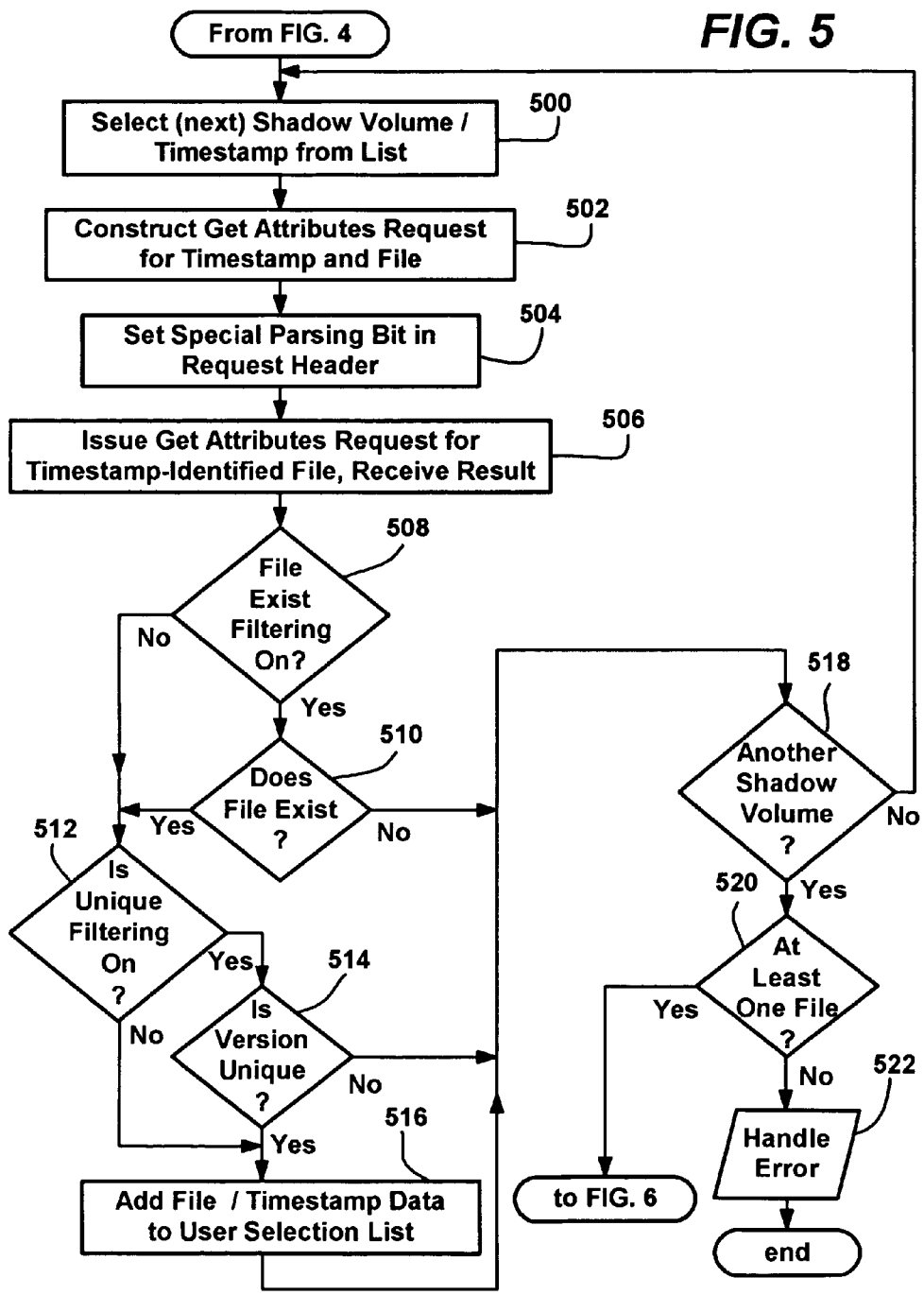
Figure 6:
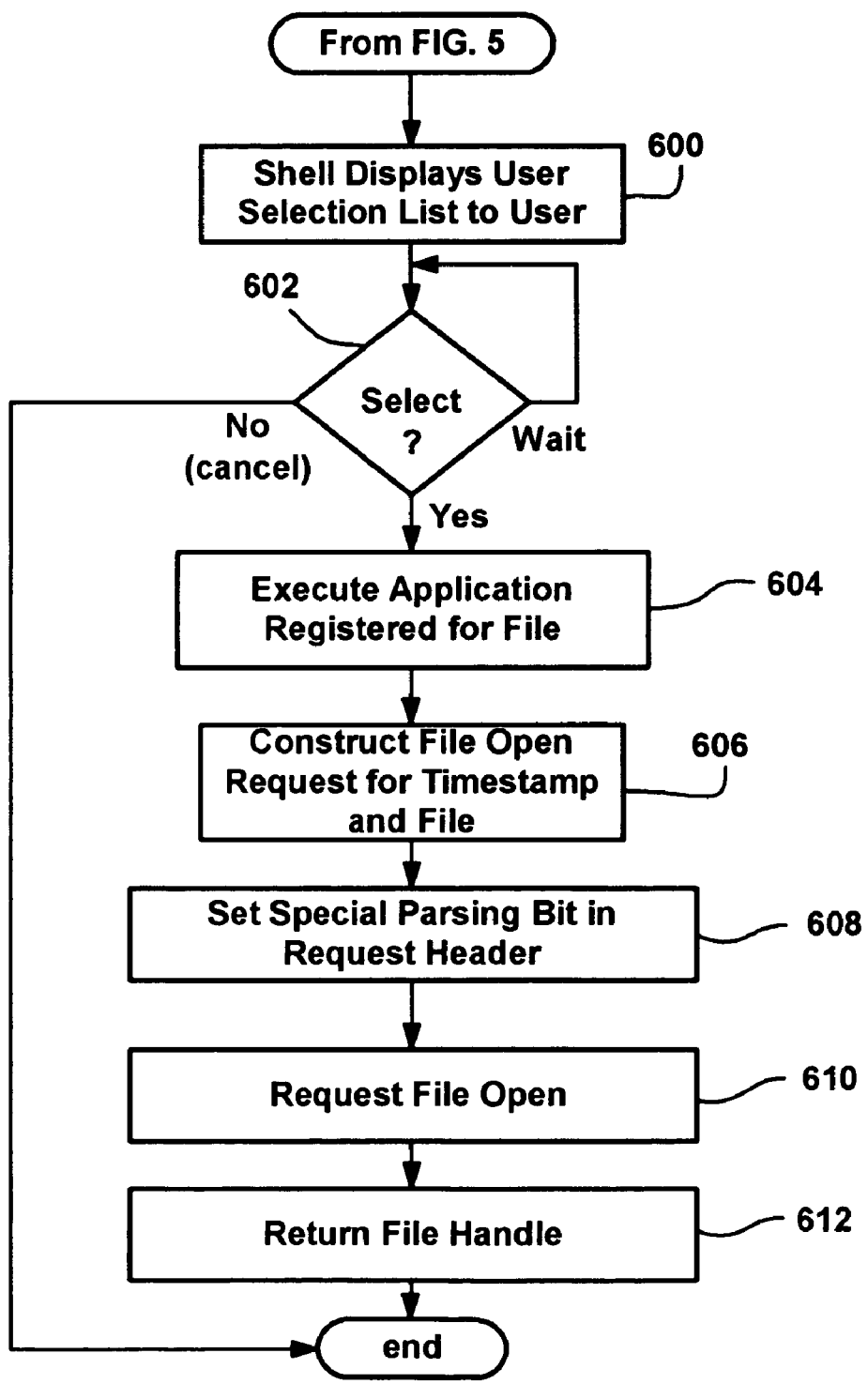

Turning to an explanation of the operation of the invention, as generally represented in the flow diagrams of FIGS. 4-6, when needed, the user via the user interface 200 (or some other entity such as an auto-recover process) starts the shadow file location process of the present invention by calling the shadow recovery API 202, identifying the file by name or the like, as generally represented by step 400 of FIG. 4. Step 402 represents the process requesting the list 300 of the shadow volumes that the server has, including each shadow volume's respective timestamp information, while step 404 represents receiving the list.

Step 406 tests whether any shadow volume timestamps have been returned. Note that shadow volumes only exist if the shadowing feature is enabled, and thus the list may be null, or alternatively, an error message indicating no such shadow volumes exist may be returned. Alternatively, in an implementation wherein the server performs file-exist filtering, it is possible that shadow volumes exist, but not the file, whereby the timestamp list would also be empty. In any event, step 416 indicates this error being handled, such as to inform the user that version recovery is not possible for this file. Note that preferably this is a different error message than one that would be returned when the network was down, e.g., a message indicating try again later likely would be more appropriate.

Assuming at least one shadow volume exists, step 408 represents updating the local data structures that are maintained for shadow volumes, that is, create and add to the set a new local data structure for caching the shadow volume information for each new shadow volume, and delete from the set those that correspond to a now-deleted shadow volume.

As described above, the user may have selected (client-side) filtering options, so that only files that exist on a shadow volume have shadow volume timestamps returned for them, and/or only file versions that are unique. Steps 410 and 412 represent the testing of these filters, since if neither is active the file version selection list 316 can be simply generated from the existing timestamp information at step 414 and provided to the user via FIG. 6. Note that the file exist filter may not be completely independent of the unique files filter, e.g., if the unique files filter is active, the file exist filter may automatically be turned active. However, for purposes of the present description, these two will be treated as independent selections, whereby, for example, a timestamp of a shadow volume with a file that does not exist will be considered as a unique timestamp for filtering purposes.

When (client-side) filtering is active, step 410 or 412 branches to step 500 of FIG. 5 to obtain the file attribute information for each shadow copy on the identified shadow volume or volumes. Step 500 of FIG. 5 represents selecting one of the shadow volumes via its timestamp on the shadow volume list 300. At step 502, a get attributes request is constructed from this selection by the API 208, including adding the timestamp to the embedded token, while step 504 represents the redirector 212 via its timestamp pre-parser 214 setting the special parsing bit in the request header. As described above, this is one way for the server to treat the request specially, e.g., the server will parse the request to extract the timestamp therefrom, to convert it to an integer that maps to or otherwise determines the correct temporal shadow volume. As also described above, the client can perform some or all of the processing (e.g., the integer conversion) needed to request the correct file version.

At step 506, the request to obtain the file's attributes is issued, with a result returned for that file. For purposes of the present description, it is assumed that the network connection is alive, whereby a result is returned, comprising the file's attributes or an appropriate error, e.g., file not found.

Step 508 represents evaluating whether the filtering for only existing files is active. If not, step 508 branches ahead to step 512 to test whether unique file filtering is active, as described below, otherwise step 508 branches to step 510 to test whether the file exists. Step 510 represents evaluating whether the file for which attributes have been requested exists. If the file does not exist, the request is repeated for another shadow copy via steps 510 and 518, without adding a version to the list, until no volumes remain. Note that although not shown in FIG. 5 for purposes of simplicity, it is understood that multiple file attribute requests may be issued at step 506 without waiting for another shadow volume's results, with each result separately evaluated as it comes in. In other words, although FIG. 5 shows the attributes being serially requested and filtered, the operation need not be serial to construct the list 316.

If a file exists on a shadow volume, step 512 tests whether unique file filtering is active. If not, step 512 bypasses step 514 and branches to step 516 where the file/timestamp is simply added to the list 316 of available files from which the user may select a file. If filtering is on, step 514 is executed, which skips adding duplicate file versions to the list 316. To this end, step 514 can evaluate the file attributes to avoid adding a file/timestamp having the same last modified time as a file already on the list, whereby the list will only contain unique file versions. Note that although not shown, step 514 can add timestamps of volumes that do not have a file to the list, treating such volumes as if the file was unique, provided the user can separately specify that unique file filtering is active, but file-exist filtering is not active. Further, note that FIG. 5 can be executed regardless of filtering, for example, so that a complete list of shadow volume timestamps may be displayed to the user, but having different appearances (e.g., colors) for timestamps representing unique file versions, timestamps where files do not exist, and/or timestamps for non-unique files.

When the available volumes have each been processed to provide the file attributes, if any exist, step 518 branches to step 520 which represents testing whether at least one file version is available for recovery. If not, this condition is handled via step 520, e.g., by informing the user that there are no file versions. Otherwise the process continues to step 600 of FIG. 6.

Step 600 represents displaying the list of files and each one's corresponding volume timestamp to the user. From this list, the user can select a file for recovery via step 602, or cancel. In the event the user selects a file, the process branches to step 604.

As can be appreciated, once a file is selected it may be treated like any other selected file, e.g., the file's extension is looked up in the registry or the like, an application program registered for that extension is automatically started, if not already running, and the file opened in the context of the application. However, unlike remote files on a server's base volume, the API or the like will construct the file open request with the timestamp token therein at step 606, and with the redirector setting the special parsing bit in the request header at step 608 so that the server will open the correct shadow version (instead of the base volume's version). Step 610 represents requesting the file open, and step 612 returning the file handle to the application, whereby it can read the file version in a normal manner from the application's perspective. Note that the file handle can be cached, e.g., by the redirector, and detected and converted to special requests as needed to retrieve the file data from the correct shadow volume, and to close the file.

Alternatives to automatically opening the file include downloading the file to a local drive, where it can be accessed like any other file, restoring the version to the server's base volume (after changing the name or otherwise acting so as to not overwrite the current version), and so forth. In any event, recovery is greatly simplified for the user.

As can be seen from the foregoing detailed description, there is provided a method and system that transparently and automatically enable restoration of prior versions of files and folders. Prior versions can be restored simply, rapidly, and with minimal expense.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-implemented method, comprising:
receiving a first request to locate information corresponding to prior versions of a file or folder, the file or folder is stored in a computer storage medium;
in response to the first request to locate the information, automatically obtaining a set of a plurality of timestamps, each timestamp of the plurality of timestamps corresponding to each shadow volume of a plurality of shadow volumes that have a prior version of the file or folder maintained therein, wherein said each shadow volume of the plurality of shadow volumes is a different point in time read-only copy of a logical volume at different times, said each shadow volume of the plurality of shadow volumes having a corresponding differential file, wherein the obtaining the set of the plurality of timestamps comprises communicating with at least one remote file server device having at least one shadow volume;
receiving an indication of whether a filtering process for the shadow volumes should be performed;
determining whether the indication indicates that unique file filtering is active;
when the unique file filtering is not active, generating a list from a set of timestamps;
when the unique file filtering is active:
for each timestamp in the set of timestamps, sending a request for file or folder attributes from a corresponding shadow volume by embedding a timestamp as a token in a path such that a distributed file server changes at distributed file system junction points do not affect the timestamp;
generating a list of timestamps based on each response to the request for the file or folder attributes, each entry in list indicative of accessibility of the file or folder associated with said each entry, wherein the request for the file or folder attributes comprises setting a special parsing bit in a header of the request such that the request is flagged and the remote file server device detects the embedded timestamp; and
filtering from the generated list of timestamps an entry of a prior version of the file that is not unique with respect to another prior version of the file already represented in the list of timestamps; and
providing the filtered list of timestamps in response to the first request to locate the information such that the information enables retrieval of a corresponding version of a file or folder in the filtered list of timestamps, and wherein selection of a prior version of a file replaces a most current version of the file.

2. The method of claim 1 wherein receiving a request to locate information comprises receiving an application program interface call.

3. The method of claim 1, wherein requesting file or folder attributes from a corresponding volume comprises, identifying a shadow volume via its corresponding timestamp in a request.

4. The method of claim 1, wherein generating the list of timestamps comprises, determine from response to the request for the file or folder attributes whether the file or folder exists on a shadow volume identified via a timestamp, and if so, including an entry representing a corresponding timestamp in the list of timestamps.

5. A computer storage medium storing instructions that when executed by a computer cause the computer to:
receive a first request to locate information corresponding to prior versions of a file or folder;
in response to the first request to locate the information, automatically obtaining a set of a plurality of timestamps, each timestamp of the plurality of timestamps corresponding to each shadow volume of a plurality of shadow volumes that have a prior version of the file or folder maintained therein, wherein said each shadow volume of the plurality of shadow volumes is a different point in time read-only copy of a logical volume at different times, said each shadow volume of the plurality of shadow volumes having a corresponding differential file, wherein the obtaining the set of the plurality of timestamps comprises communicating with at least one remote file server device having at least one shadow volume;
receive an indication of whether a filtering process for the shadow volumes should be performed;
determine whether the indication indicates that unique file filtering is active;
when the unique file filtering is not active, generating a list from a set of timestamps;
when the unique file filtering is active:
for each timestamp in the set of timestamps, sending a request for file or folder attributes from a corresponding shadow volume by embedding a timestamp as a token in a path such that a distributed file server changes at distributed file system junction points do not affect the timestamp;
generate a list of timestamps based on each response to the request for the file or folder attributes, each entry in list indicative of accessibility of the file or folder associated with said each entry, wherein the request for the file or folder attributes comprises setting a special parsing bit in a header of the request such that the request is flagged and the remote file server device detects the embedded timestamp; and
filter from the generated list of timestamps an entry of a prior version of the file that is not unique with respect to another prior version of the file already represented in the list of timestamps; and
provide the filtered list of timestamps in response to the first request to locate the information such that the information enables retrieval of a corresponding version of a file or folder in the filtered list of timestamps, and wherein selection of a prior version of a file replaces a most current version of the file.

6. The computer storage medium of claim 5, wherein receive a request to locate information comprises receiving an application program interface call.

7. The computer storage medium of claim 5, wherein request file or folder attributes from a corresponding volume comprises, identifying a shadow volume via its corresponding timestamp in a request.

8. The computer storage medium of claim 5, wherein generate the list of timestamps comprises, determine from response to the request for the file or folder attributes whether the file or folder exists on a shadow volume identified via a timestamp, and if so, including an entry representing a corresponding timestamp in the list of timestamps.

9. A computing device included a processor and a memory, the computing device configured to:
receive a first request to locate information corresponding to prior versions of a file or folder, the file or folder is stored in a computer readable storage medium;
in response to the first request to locate the information, automatically obtaining a set of a plurality of timestamps, each timestamp of the plurality of timestamps corresponding to each shadow volume of a plurality of shadow volumes that have a prior version of the file or folder maintained therein, wherein said each shadow volume of the plurality of shadow volumes is a different point in time read-only copy of a logical volume at different times, said each shadow volume of the plurality of shadow volumes having a corresponding differential file, wherein the obtaining the set of the plurality of timestamps comprises communicating with at least one remote file server device having at least one shadow volume;

receive an indication of whether a filtering process for the shadow volumes should be performed;

determine whether the indication indicates that unique file filtering is active;

when the unique file filtering is not active, generating a list from a set of timestamps;

when the unique file filtering is active:
  for each timestamp in the set of timestamps, sending a request for file or folder attributes from a corresponding shadow volume by embedding a timestamp as a token in a path such that a distributed file server changes at distributed file system junction points do not affect the timestamp;
  generate a list of timestamps based on each response to the request for the file or folder attributes, each entry in list indicative of accessibility of the file or folder associated with said each entry, wherein the request for the file or folder attributes comprises setting a special parsing bit in a header of the request such that the request is flagged and the remote file server device detects the embedded timestamp; and
  filter from the generated list of timestamps an entry of a prior version of the file that is not unique with respect to another prior version of the file already represented in the list of timestamps; and provide the filtered list of timestamps in response to the first request to locate the information such that the information enables retrieval of a corresponding version of a file or folder in the filtered list of timestamps, and wherein selection of a prior version of a file replaces a most current version of the file.

10. The computing device of claim 9, wherein receive a request to locate information comprises receiving an application program interface call.

11. The computing device of claim 9, wherein requesting file or folder attributes from a corresponding volume comprises, identifying a shadow volume via its corresponding timestamp in a request.

12. The computing device of claim 9, wherein generate the list of timestamps comprises, determine from response to the request for the file or folder attributes whether the file or folder exists on a shadow volume identified via a timestamp, and if so, including an entry representing a corresponding timestamp in the list of timestamps.

* * * * *